(12) United States Patent
Anderson (10) Patent No.: US 10,181,675 B1
(45) Date of Patent: Jan. 15, 2019

(54) ELECTRICAL OUTLET PLUG STRIP

(71) Applicant: Kenneth E. Anderson, Kearney, NE (US)

(72) Inventor: Kenneth E. Anderson, Kearney, NE (US)

( * ) Notice: Subject to any disclaimer, the term of this patent is extended or adjusted under 35 U.S.C. 154(b) by 0 days.

(21) Appl. No.: 15/846,484

(22) Filed: Dec. 19, 2017

(51) Int. Cl.
*H01R 13/60* (2006.01)
*H01R 13/506* (2006.01)
*H01R 13/518* (2006.01)
*A47B 77/08* (2006.01)
*H01R 13/73* (2006.01)
*H01R 25/00* (2006.01)

(52) U.S. Cl.
CPC .......... *H01R 13/506* (2013.01); *A47B 77/08* (2013.01); *H01R 13/518* (2013.01); *H01R 13/73* (2013.01); *H01R 25/006* (2013.01)

(58) Field of Classification Search
CPC .... H01R 13/518; H01R 13/506; H01R 13/73; H01R 25/006; A47B 77/08
USPC .................................................. 439/532, 535
See application file for complete search history.

(56) References Cited

U.S. PATENT DOCUMENTS

| | | | | |
|---|---|---|---|---|
| 594,998 A * | 12/1897 | Lyle | ........................ | F16L 9/22 138/157 |
| 2,313,452 A * | 3/1943 | O'Brien | ............... | H01R 25/164 307/112 |
| 2,384,487 A * | 9/1945 | O'Brien | ............... | H01R 25/161 439/113 |
| 2,899,668 A * | 8/1959 | Gribben | ................ | H01R 25/14 439/115 |
| 3,239,795 A * | 3/1966 | Verrone | ............... | H01R 25/162 439/121 |
| 3,461,349 A * | 8/1969 | Meyer | .................. | H01R 25/164 174/50 |
| 4,308,418 A * | 12/1981 | Van Kuik | ............. | H02G 3/288 138/128 |
| 4,395,640 A * | 7/1983 | Bone | .................... | H01R 25/165 220/3.9 |
| 5,092,786 A * | 3/1992 | Juhlin | .................. | H01R 25/162 439/215 |
| 5,259,774 A * | 11/1993 | Gabrius | ................. | F21V 21/35 439/110 |
| D431,529 S * | 10/2000 | Giese | ........................ | D13/139.6 |
| 6,323,421 B1 * | 11/2001 | Pawson | ................ | H02G 3/0418 174/503 |
| 6,497,586 B1 * | 12/2002 | Wilson | .................. | H01R 13/73 362/383 |
| 7,087,840 B2 * | 8/2006 | Herring | ................ | H02G 3/0431 174/101 |
| 7,156,694 B1 * | 1/2007 | Anderson | ........... | F21V 33/0012 439/110 |
| D551,169 S * | 9/2007 | Tropp | ....................... | D13/139.6 |
| 7,351,116 B2 * | 4/2008 | Dold | .................... | H01R 9/2658 439/716 |
| 7,448,875 B2 * | 11/2008 | Timmins | ................. | H04Q 1/13 439/49 |

(Continued)

*Primary Examiner* — Abdullah Riyami
*Assistant Examiner* — Vladimir Imas
(74) *Attorney, Agent, or Firm* — Dennis L. Thomte; Thomte Patent Law Office LLC (57) ABSTRACT

Electrical outlet plug strips are positioned at the underside of a kitchen cabinet or cabinets. The plug strips include covers which are designed to shield or cover the gaps between adjacent plug strips and to shield or cover support members positioned at the bottoms of adjacent cabinets.

5 Claims, 6 Drawing Sheets

(56) References Cited

U.S. PATENT DOCUMENTS

| | | | | |
|---|---|---|---|---|
| 7,488,202 B2* | 2/2009 | Spitaels | ............... | H01R 13/741 |
| | | | | 439/532 |
| 7,690,921 B2* | 4/2010 | Timmins | .................. | H04Q 1/13 |
| | | | | 439/49 |
| 7,741,568 B2* | 6/2010 | Makwinski | ............ | H02G 3/0418 |
| | | | | 174/480 |
| 7,819,676 B1* | 10/2010 | Cardoso | ............... | H01R 13/245 |
| | | | | 439/115 |
| 8,093,510 B2* | 1/2012 | Makwinski | ............ | H02G 3/0418 |
| | | | | 174/480 |
| 8,341,810 B2* | 1/2013 | Rayos | ..................... | B60R 9/048 |
| | | | | 224/321 |
| 8,403,686 B2* | 3/2013 | Pizzi | ...................... | H01R 9/265 |
| | | | | 439/111 |
| 8,444,432 B2* | 5/2013 | Byrne | .................. | H01R 13/514 |
| | | | | 439/540.1 |
| 8,480,420 B2* | 7/2013 | Ziobro | ..................... | F21S 6/003 |
| | | | | 439/214 |
| 8,480,429 B2* | 7/2013 | Byrne | .................... | H02G 3/128 |
| | | | | 439/574 |
| 8,558,710 B1* | 10/2013 | Nitz | .......................... | H02G 3/18 |
| | | | | 340/654 |
| 9,246,317 B2* | 1/2016 | Byrne | .................... | H02G 3/105 |
| 9,312,673 B2* | 4/2016 | Byrne | .................... | H02G 3/185 |
| 9,326,418 B2* | 4/2016 | Knight | .................. | H05K 7/1492 |
| 9,438,070 B2* | 9/2016 | Byrne | .................... | H02J 5/005 |
| 9,627,873 B2* | 4/2017 | Makwinski | ............ | H02G 3/0608 |
| 9,640,960 B2* | 5/2017 | Makwinski | ............. | H02G 3/128 |
| 2008/0041623 A1* | 2/2008 | Makwinski | ............ | H02G 3/0418 |
| | | | | 174/481 |

* cited by examiner

ELECTRICAL OUTLET PLUG STRIP

BACKGROUND OF THE INVENTION

Field of the Invention

This invention relates to an electrical outlet plug strip and more particularly to an electrical outlet plug strip for use beneath a kitchen cabinet positioned above a kitchen countertop. Even more particularly, this invention relates to an electrical outlet plug strip wherein one end of the cover thereof extends beyond one end of the housing of the plug strip to cover the juncture of the plug strip with another adjacent plug strip or to cover a support member at the lower adjacent ends of a pair of cabinets.

Description of the Related Art

Figure 1:
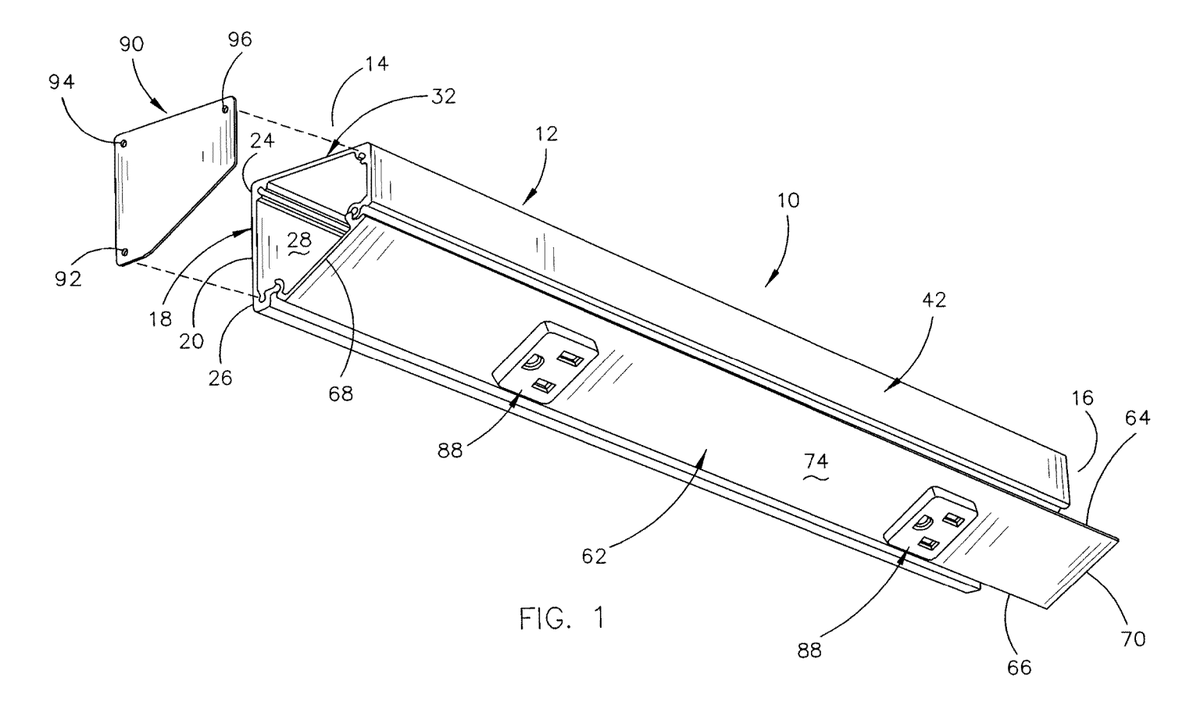
FIG. 1 is a perspective view of the electrical outlet plug strip of this invention and which also shows an end cap which may be secured to one end of the housing of the plug strip.

In most kitchens, cabinets are positioned above horizontally extending countertops. Frequently, electrical outlet plug strips are secured to the supporting wall directly below the bottom of the cabinet. Prior to Applicant's U.S. Pat. No. 7,156,694, the disclosure of which is incorporated herein by reference thereto, the prior art designs thereof were usually of one or two designs. As seen in FIG. 1 of Applicant's U.S. Pat. No. 7,156,694, one prior art plug strip includes a vertically disposed outer wall in which horizontally spaced-apart electrical outlets are provided. Although the electrical outlets are fairly visible to the person about to insert an electrical plug into one of the outlets, the close proximity of the outlet to the bottom wall of the cabinet makes it difficult for a person to grasp the electrical plug and insert the same into the outlet due to the small distance between the outlet and the bottom wall of the cabinet.

Figure 2:
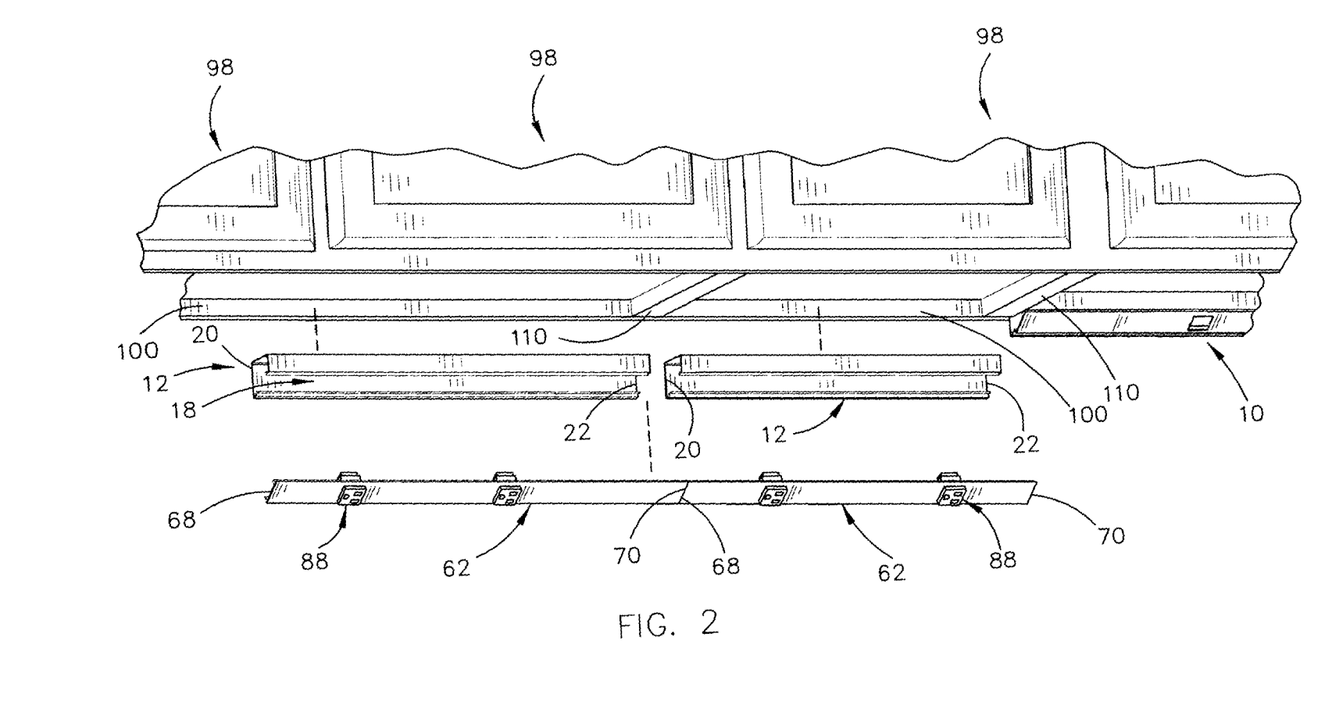
FIG. 2 is a partial perspective view illustrating the manner in which a plurality of outlet plug strips are secured to the underside of a plurality of kitchen cabinets.
Figure 3:
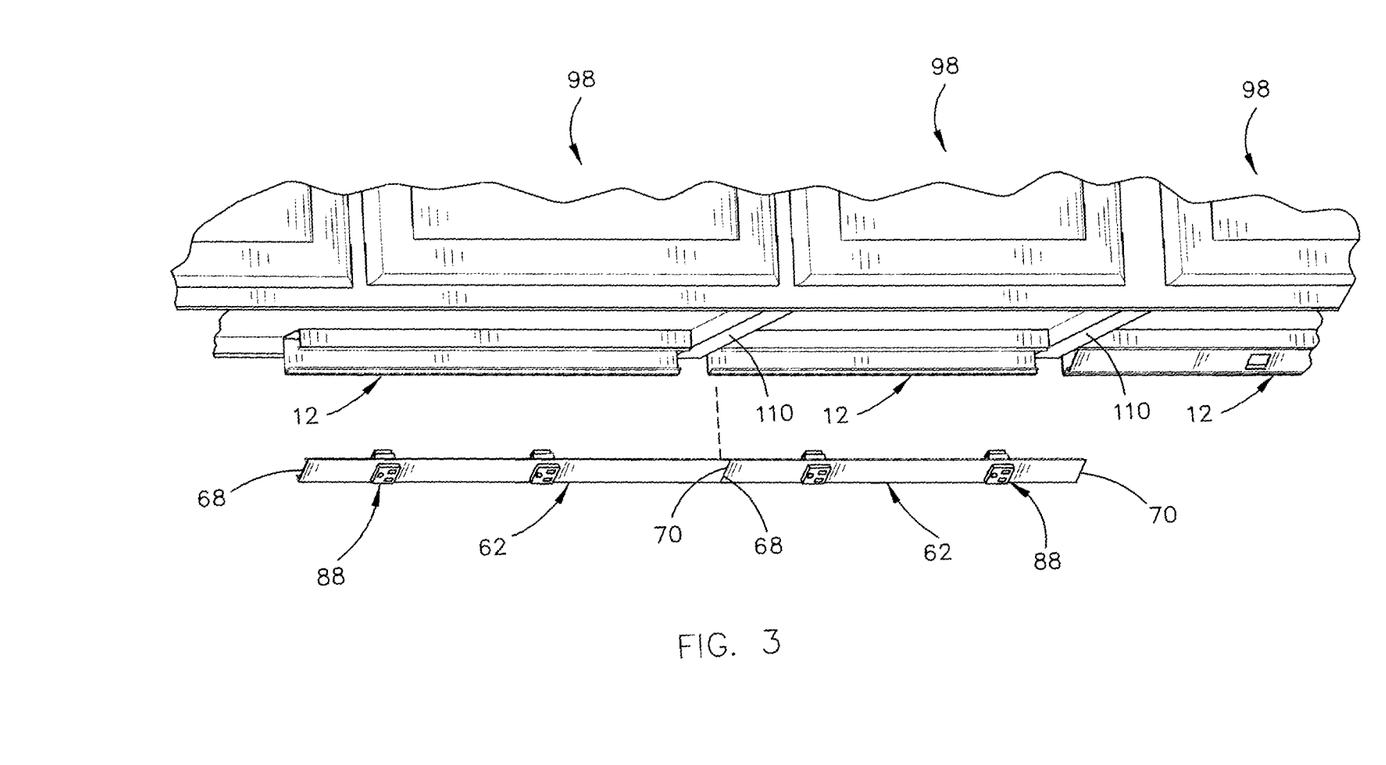
FIG. 3 is a view similar to FIG. 2 except that the housings of the outlet plug strips have been secured to the underside of the kitchen cabinets.

In the prior art embodiment of FIG. 2 of U.S. Pat. No. 7,156,694, the electrical outlets are provided in the bottom of the plug strip which eliminates the clearance problems of the strip of FIG. 1 of U.S. Pat. No. 7,156,694. However, since the outlets are located in the bottom wall of the strip, it is difficult, if not impossible, for a person to visually observe the outlet to enable the person to properly position the electrical plug to facilitate the insertion of the plug into the outlet. This is made especially difficult due to the fact that the countertop positioned below the cabinet makes it difficult for a person to position his/her head to observe the connection.

Although Applicant's U.S. Pat. No. 7,156,694 represented a distinct improvement in the prior art, if two plugs strips thereof were positioned adjacent one another, in an end-to-end relationship, the juncture therebetween would be quite apparent. In those cabinets which are joined together to create a wall of cabinets, the lower ends of adjacent cabinets are joined together at their lower ends by a support member or cleat. Thus, if a plug strip is positioned at the lower end of a first cabinet, the end of the plug strip would abut one side of the cleat and the end of an adjacent plug strip at the lower end of the adjacent cabinet would abut against the cleat thereby creating a gap between the adjacent ends of the plug strips. The presence of the gaps detract from the appearance of the plug strips at the lower ends of the cabinets.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

An elongated outlet plug strip is disclosed which includes an elongated and horizontally disposed housing having a first end and a second end. The housing includes an elongated and vertically disposed inner wall member having a first end, a second end, an upper end, a lower end, an inner side and an outer side. The housing also includes an elongated and horizontally disposed upper wall member having a first end, a second end, an inner end, an outer end, an upper side, a lower side, an inner end and an outer end. The inner end of the upper wall member is joined to the upper end of the inner wall member so as to extend horizontally outwardly therefrom. The housing also includes an elongated and vertically disposed outer wall member having a first end, a second end, an upper end, a lower end, an inner side and an outer side. The upper end of the outer wall member is joined to the outer end of the upper wall member so as to extend downwardly therefrom. An elongated and horizontally disposed first connector element is secured to the lower end of the outer wall member. The lower end of the inner end wall member has an elongated and horizontally disposed second connector element secured thereto.

The outlet plug strip also includes an elongated cover having a first end, a second end, an upper end, a lower end, an inner side and an outer side. The upper end of the cover has an elongated first connector element formed therein and the lower end of the cover has an elongated second connector element formed therein. The first connector element of the cover is configured to be selectively removably secured to the first connector element at the lower end of the outer wall member. The second connector member of the cover is configured to be selectively removably secured to the second connector element at the lower end of the outer wall member. The cover has a length which is greater than the length of the housing. In some cases, the cover will have a length which is shorter than the length of the housing. In the preferred embodiment, the second end of the cover extends beyond the second end of the housing.

It is therefore a principal object of the invention to provide an improved electrical outlet plug strip for use beneath the kitchen cabinet positioned above a kitchen countertop or the like.

A further object of the invention is to provide an electrical outlet plug strip which includes an elongated and horizontally disposed housing having a cover mounted thereon with one end of the cover extending beyond one end of the housing.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The plug strip of this invention is referred to by reference numeral 10. Plug strip 10 includes a horizontally disposed housing 12 having a first open end 14 and a second open end 16. Housing 12 includes an elongated and vertically disposed inner wall member 18 having a first end 20 and a second end 22. Inner wall includes an upper end 24, a lower end 26, an inner side 28 and an outer side 30.

Figure 5:
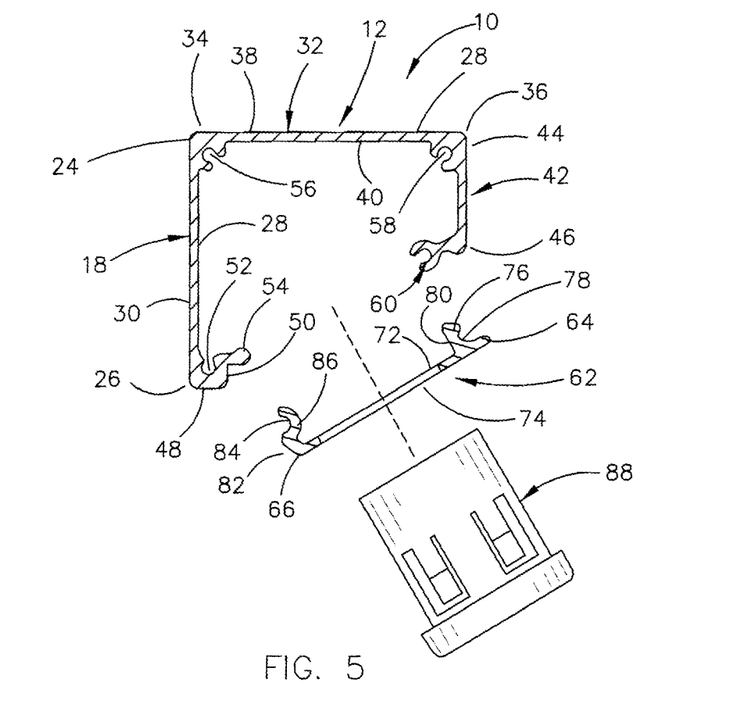
FIG. 5 is an exploded sectional view illustrating the housing, the cover and an electrical outlet of the plug strip of the invention.

Housing 12 also includes a horizontally disposed upper wall member 32 having an inner end 34, an outer end 36, an upper side 38 and a lower side 40. The numeral 42 refers to a vertically disposed outer wall member 42 having an upper end 44 and a lower end 46. A short bottom wall 48, which is horizontally disposed, extends inwardly from the lower end 26 of wall 18. A short vertically disposed wall member 50 extends upwardly from the inner end of wall member 48 to define a recess 52. An elongated arcuate lip 54 extends inwardly from the upper end of wall 50 as seen in FIG. 5.

An elongated recess 56 is formed at the juncture of the inner end 34 of wall member 32 and the upper end 24 of wall member 18. An elongated recess 58 is formed at the juncture of the outer end 36 of wall member 32 and the upper end 44 of wall member 42. An elongated connector member 60 extends inwardly from the lower end 46 of wall member 42.

The numeral 62 refers to a cover of the housing 12 which is snap-fitted into place to close the outer end of the housing 12. The cover 62 includes an upper end 64, a lower end 66, a first end 68, a second end 70, an inner side 72 and an outer side 74. The upper end 64 of cover 62 has an inwardly protruding portion 76 which defines an arcuate recess 78 and a shoulder 80. Cover 62 includes a protruding connector element 82 which defines an arcuate recess 84 and a shoulder 86.

Figure 6:
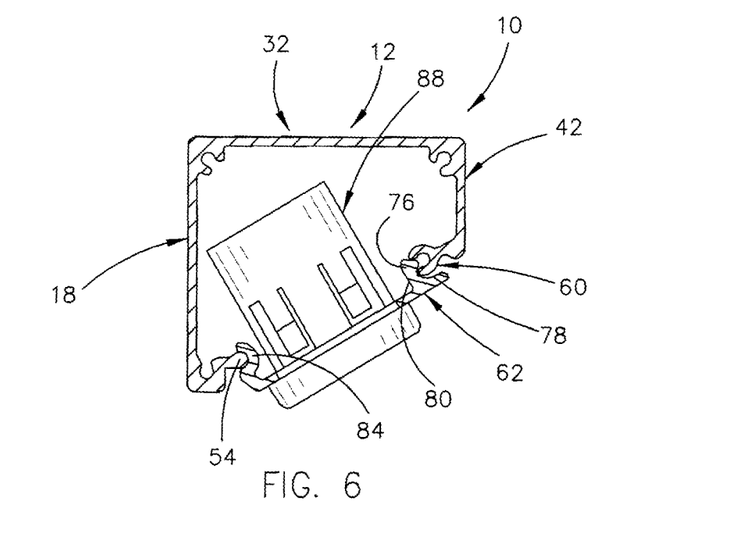
FIG. 6 is a view similar to FIG. 5 except that the cover and the electrical outlet have been attached to the housing of the plug strip.

Cover 62 is mounted on housing 12 as follows. The cover 62 is manipulated so that lip 54 is received by recess 84. Cover 62 is then pivotally moved upwardly in a counter clock-wise direction to the closed position of FIG. 6. In the closed position of FIG. 6, the protruding portion 76 is snapped into the open end of connector element 60 and with the lower end of connector member 60 being received in recess 78. Thus, the cover 62 is snap-fitted with respect to housing 12 to close the outer lower end of housing 12.

The cover 62 is provided with a plurality of horizontally spaced-apart electrical outlets 88 formed therein which are of 110-115 VAC type. The outlets 88 are connected to a source of electrical power in conventional fashion. The number 90 refers to an end cap which may be used to close either end of housing 12 if desired. End cap 90 has screw openings 92, 94 and 96 formed therein. End cap 90 may be secured to housing 12 by screws extending through screw openings 92, 94 and 96 into recesses 52, 56 and 58 respectively.

As seen in the drawings, cover 62 has a greater length than the housing 12 so that end 70 extends beyond the end 16 of housing. In some cases, the cover 62 of the end-most housing 12 of a series of plug strips 10 will be shorter than the length of the associated plug strips. The lengths of the plug strips 10 may vary in in length depending upon the width of the cabinets to which they are secured.

Figure 7:
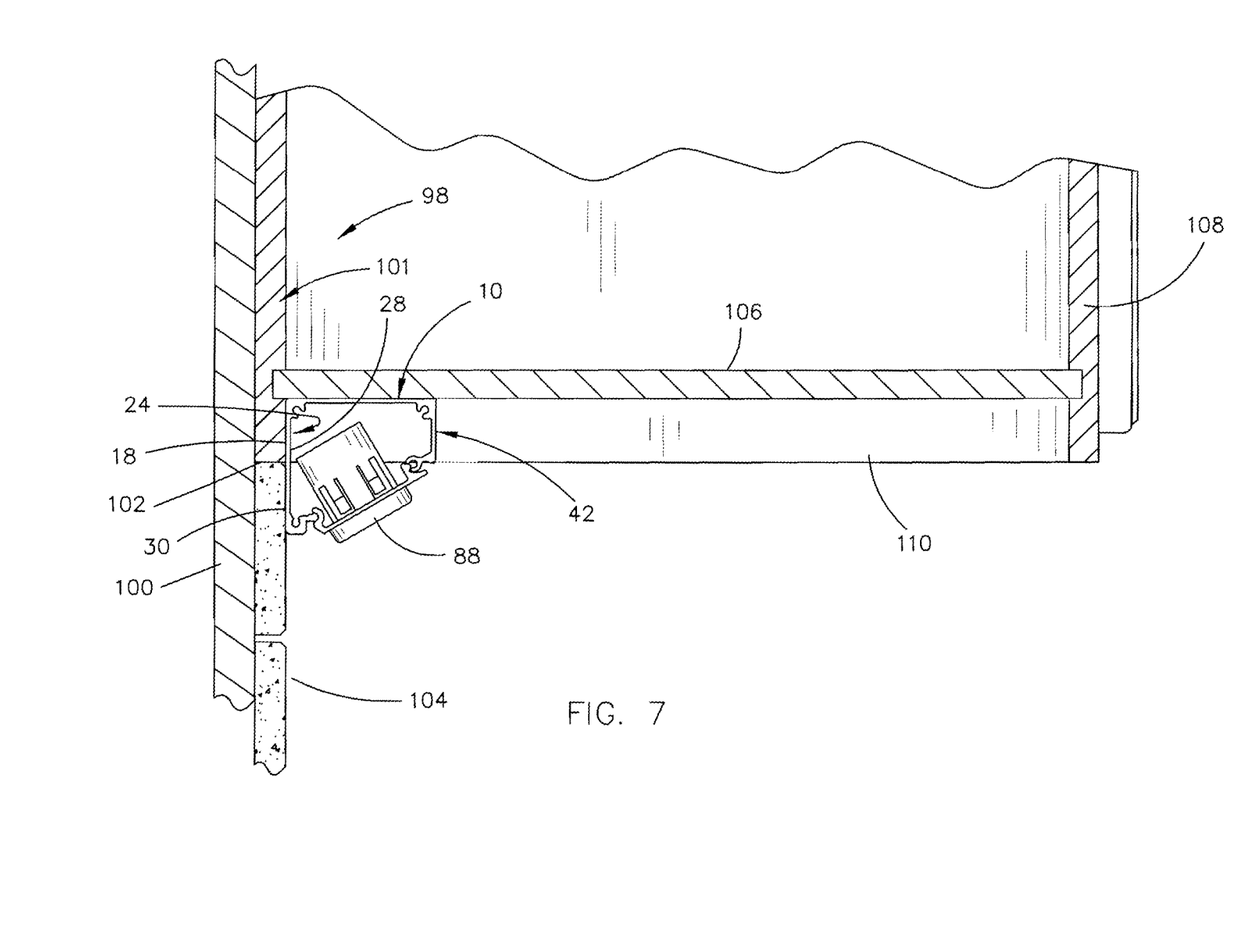
FIG. 7 is a partial sectional view illustrating the manner in which the electrical outlet plug strip of this invention is secured to the underside of a kitchen cabinet.

FIG. 7 illustrates a typical wall cabinet 98 mounted on a wall 100. Cabinet 98 includes a back panel 101 having a lower end 102 positioned at the upper end of a back splash member 104 such as tile or the like. Cabinet 98 includes a bottom 106 and a face frame 108. When a plurality of cabinets 98 are mounted on the wall 100 in a side-by-side manner, a horizontally disposed support member 110 will be positioned at the underside of the adjacent bottoms of the cabinets 98 at the juncture of the bottoms thereof so as to extend between the lower ends of the back panels and the face frames 108 thereof as seen in the drawings.

If the plug strips 10 had covers 62 which only extended between the support members 110, there would be a visible gap at the juncture of the support members 110. The instant invention shields or hides those gaps so that a continuous face for the plug strips 10 is provided. As seen in FIG. 2, if the conventional housings 12 of adjacent plug strips 10 were mounted at the underside of the cabinets 98, the ends of adjacent housings 12 would be spaced-apart and the support member 110 would be visible.

Figure 4:
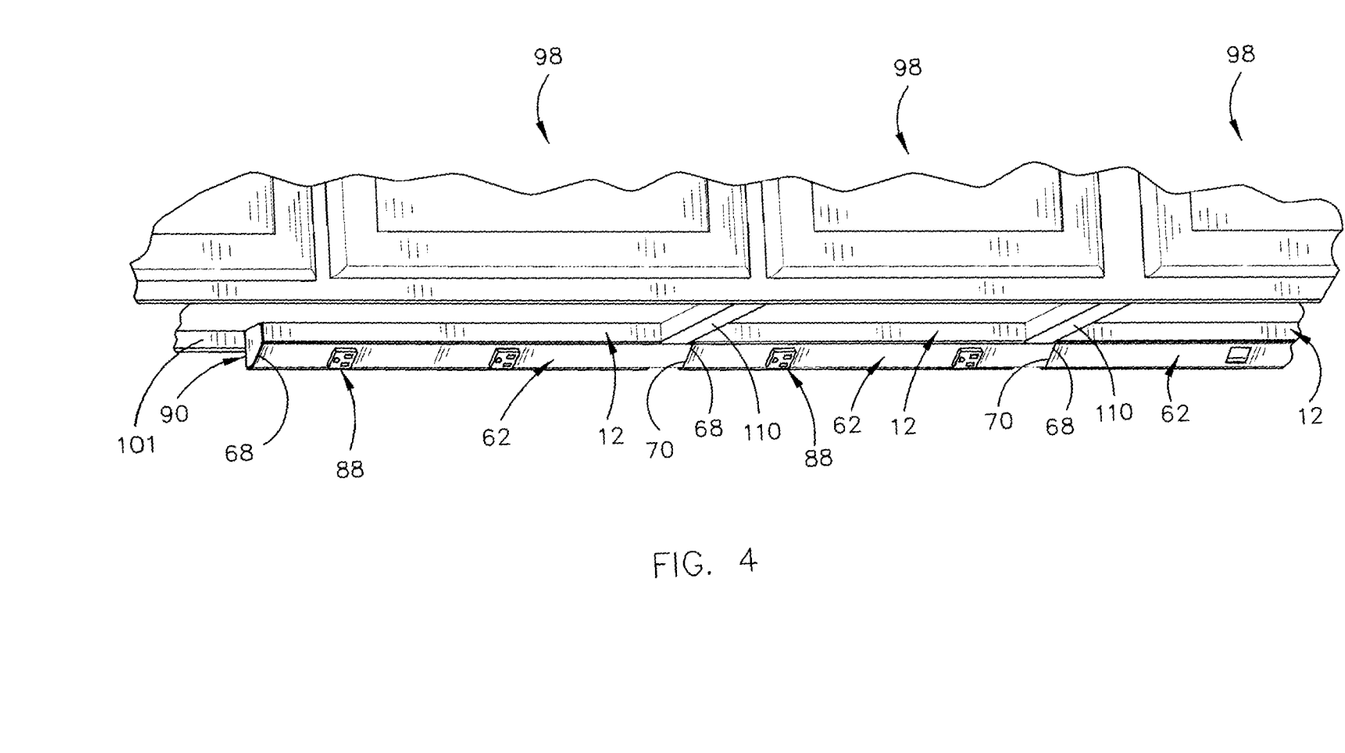
FIG. 4 is a view similar to FIGS. 2 and 3 except that the outlet plug strips have been secured to the underside of a plurality of kitchen cabinets.

As seen in FIG. 4, when the plug strips 10 are mounted on the underside of the cabinets 98, the second ends 70 of covers 62 extend laterally from the housings 12 to shield or cover the support member 110 to present an uninterrupted face to the adjacent plug strips 10. In most cases, the end-most plug strip 10 will have a shorter length than depicted in the drawings since the cover of the adjacent plug strip will extend over a portion of the end-most plug strip.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. An outlet plug strip assembly, comprising:
    a horizontally disposed first outlet plug strip having a first end and a second end;
    a horizontally disposed second outlet plug strip having a first end and a second end;

said first and second outlet plug strip being positioned in an adjacent end-to-end manner whereby said second end of said first outlet plug is spaced from said first end of said second outlet plug strip;

each of said first and second outlet plug strips including a horizontally disposed housing having a first end and a second end;

each of said housings of said first and second outlet plug strips including:
(a) an elongated and vertically disposed inner wall member having a first end, a second end, an upper end, a lower end, an inner side and outer side;
(b) said lower end of said inner wall member having an elongated and horizontally disposed first connector element secured thereto;
(c) an elongated and horizontally disposed upper wall member having a first end, a second end, an inner end, an outer end, an upper side, a lower side, an inner end and an outer end;
(d) said inner end of said upper wall member being joined to said upper end of said inner wall member so as to extend horizontally outwardly therefrom;
(e) an elongated and vertically disposed outer wall member having a first end, a second end, an upper end, a lower end, an inner side and an outer side;
(f) said upper end of said outer wall member being joined to said outer end of said upper wall member so as to extend downwardly therefrom;
(g) an elongated and horizontally disposed second connector element secured to said lower end of said outer wall member;

each of said first and second outlet plug strips having an elongated first cover having a first end, a second end, an upper end, a lower end, an inner side and an outer side;

said upper end of said first cover having an elongated third connector element formed therein;

said lower end of said first cover having an elongated fourth connector element formed therein;

said fourth connector element of said first cover configured to be selectively removably secured to said first connector element at said lower end of said outer wall member of said first outlet plug strip;

said third connector of said cover configured to be selectively removably secured to said second connector element at said lower end of said outer member of said first outlet plug strip;

said cover of said first outlet plug strip having a length which is greater than the length of said housing of said first outlet plug strip; and said second end of said cover of said first outlet plug strip extending over said first end of said second outlet plug strip and being secured thereto to extend over the gap between said second end of said first outlet plug strip and said first end of said second outlet plug strip.

2. The outlet plug strip assembly of claim 1 wherein said first end of said cover of said second outlet plug strip abuts said second end of said cover of said first outlet plug strip.

3. The outlet plug strip assembly of claim 2 wherein said second end of said cover of said second outlet plug strip terminates at said second end of said second outlet plug strip.

4. The outlet plug strip assembly of claim 2 wherein said second end of said cover of said second outlet plug assembly extends outwardly of said second end of said outlet plug strip.

5. An electrical outlet plug strip assembly for use with a first wall cabinet and a second wall cabinet positioned adjacent the first wall cabinet with the first and second wall cabinets being spaced above a horizontally disposed surface and with each of the first and second wall cabinets including a horizontally disposed bottom having a first end, a second end, a back end, a front end, an upper side, a lower side, and a horizontally disposed support member, having first and second sides, positioned at the lower sides of the first and second wall cabinets at the juncture of the bottoms of the first and second wall cabinets, comprising:

a horizontally disposed and elongated first outlet plug strip positioned at the lower side of the bottom of the first wall cabinet;

said first outlet plug strip having first and second ends with said second end thereof being positioned adjacent said first side of said support member;

a horizontally disposed and elongated second outlet plug strip positioned at the lower side of the second wall cabinet;

said second outlet plug strip having first and second ends with said first end thereof being positioned adjacent said second side of said support member;

each of said first and second outlet plug strips including an elongated housing having an elongated cover selectively removably secured thereto with each of said covers having a first and second end;

said cover of said first outlet plug strip having a length greater than the length of said housing whereby said second end of said cover of said first outlet plug strip extends over said support member and said first end of said second outlet plug strip to present a continuous cover; and said cover of said second outlet plug strip extending from said second end of said cover of said first outlet plug strip to at least said second end of said second outlet plug strip.

* * * * *